United States Patent [19]

Niki

[11] 4,202,440
[45] May 13, 1980

[54] APPARATUS FOR ACCUMULATING MATERIALS ON A SHUTTLE CONVEYOR

[75] Inventor: Akira Niki, Kariya, Japan

[73] Assignee: Nagoya Kiko Kabushiki Kaisha, Japan

[21] Appl. No.: 900,915

[22] Filed: Apr. 28, 1978

[51] Int. Cl.² .............................................. B65G 25/00
[52] U.S. Cl. ..................................... 198/718; 198/744
[58] Field of Search ................ 198/459, 460, 741–744, 198/746; 104/162; 198/718

[56] References Cited

U.S. PATENT DOCUMENTS

| | | | |
|---|---|---|---|
| 3,385,418 | 5/1968 | Broser | 198/744 |
| 3,744,621 | 7/1973 | Adams et al. | 198/744 |

Primary Examiner—Joseph E. Valenza

Attorney, Agent, or Firm—Basile and Weintraub

[57] ABSTRACT

An apparatus for accumulating materials on a shuttle conveyer has a plurality of longitudinally spaced apart dogs vertically rotatably supported on a longitudinally moving body on a shuttle conveyer frame. Each of the dogs is rotatable between a lowered position and a raised position in which it projects above a carrying surface to engage a material on rollers forming the conveyer. A magnet is provided for each dog to maintain it in its raised position. A plurality of detecting levers are vertically rotatably supported on the conveyer frame for detecting any material when such material rides on one end of the lever which projects above the carrying surface, and releasing a corresponding dog into its lowered position.

6 Claims, 12 Drawing Figures

4,202,440

APPARATUS FOR ACCUMULATING MATERIALS ON A SHUTTLE CONVEYOR

BACKGROUND OF THE INVENTION

Field of the Invention

This invention relates to an apparatus for accumulating materials on a shuttle conveyer.

In a conventional shuttle conveyer in which materials may be accumulated, accumulation or presence of the material is detected by a dog and engagement of the next dog with the next material is controlled by said detection. In this case, dogs rub and damage the base surface of the accumulated material, which is particularly serious when the period of accumulation is long.

SUMMARY OF THE INVENTION

It is an object of this invention to provide an apparatus for accumulating materials on a shuttle conveyer without doing any damage to the materials.

It is another object of this invention to provide a material accumulating apparatus for a shuttle conveyer in which materials may be accumulated and discharged quickly.

BRIEF DESCRIPTION OF THE DRAWINGS

The invention will now be described in detail by way of example referring to the accompanying drawings, in which.

DESCRIPTION OF THE PREFERRED EMBODIMENTS

Figure 5:
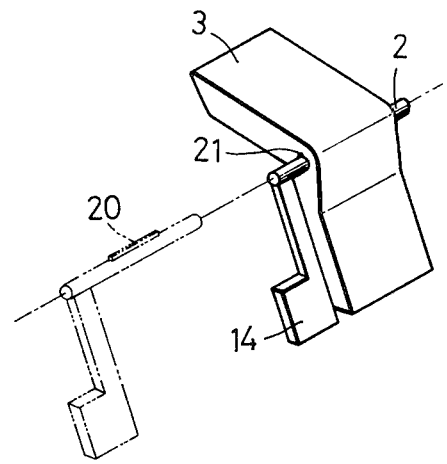
FIG. 5 is a perspective view of a dog in the apparatus of this invention.
Figure 6:
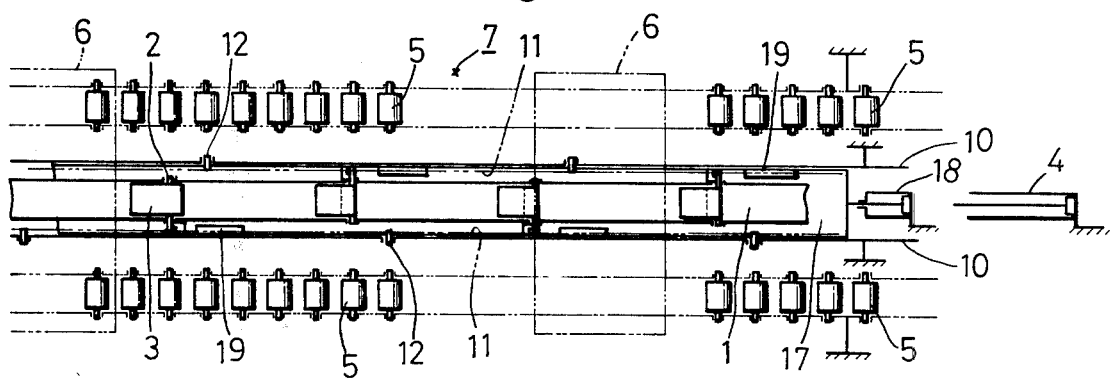
FIG. 6 corresponds to FIG. 1 and illustrates operations of an embodiment of this invention.

Referring now to the drawings, there is depicted a shuttle conveyer 7, a plurality of dogs 3 are rotatably mounted to a channel-shaped moving body 1 by pins 2. Each dog 3 is generally L-shaped as shown in FIG. 5 and formed by two parts, i.e., a head portion and a root portion which is lighter in weight than the head portion. The dogs 3 are shuttled together with the moving body 1 by means of an air cylinder 4 to transfer materials 6 intermittently along a carrying surface F formed by a double row of rollers 5. The dogs 3 are spaced apart from one another at a distance which determines the distance of each intermittent travel of materials. A permanent magnet 8 is mounted to the moving body 1 adjacent to each dog 3 as a means to attract the root portion of the dog 3 and maintain the dog 3 in its raised position in which the head portion of the dog 3 projects above the carrying surface F to engage with the material 6 on the rollers 5 as shown on the right-hand side of FIG. 2.

Figure 2:
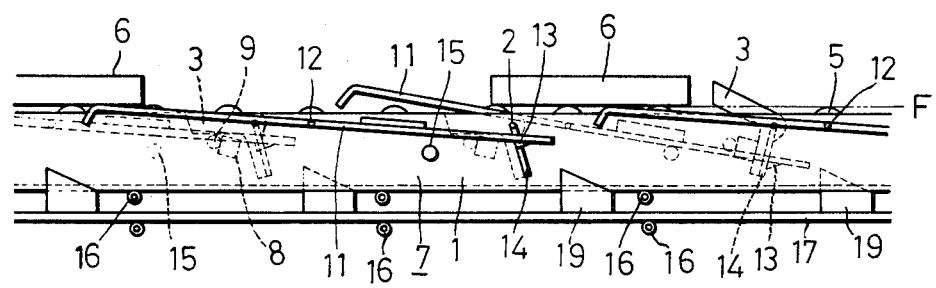
FIG. 2 is a sectional view taken along line II—II of FIG. 1.
Figure 3:
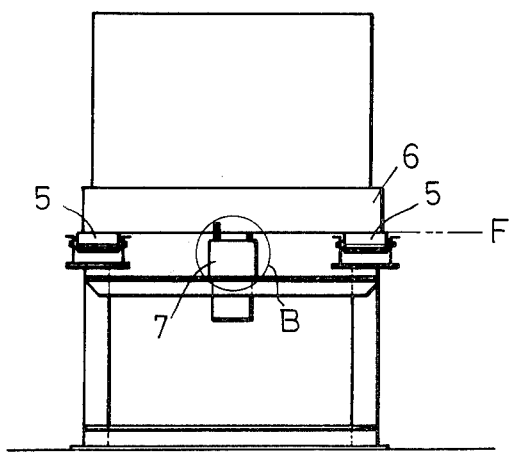
FIG. 3 is a right side elevation of FIG. 2.
Figure 4:
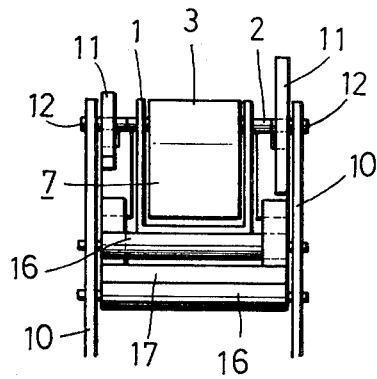
FIG. 4 is a detail view of the portion B in FIG. 2.

When the dog 3 withdraws in its raised position and contacts the material 6 on the rollers 5, the dog 3 rotates in the counterclockwise direction in FIG. 2 and is separated from the magnet 8. The dog 3 further rotates by its own weight into its lowered position in which the head portion of the dog 3 is concealed below the surface F entirely and rests on a stop 9 to keep the dog 3 from contacting the material 6 on the rollers 5.

A plurality of detecting levers 11 are rotatably mounted to a frame 10 by pins 12 to detect the presence of a material 6 in a particular position on the carrying surface F. The detecting levers 11 are inclined and supported on the pins 12 in their mid-portions. Each detecting lever 11 is operationally associated with one of the dogs 3 and has a lower end located adjacent to the dog 3 with which the detecting lever 11 is operationally associated. The upper end of each detecting lever 11 is located between two adjoining dogs 3 ahead of the dog 3 with which the detecting lever 11 is operationally associated, and is capable of projecting above the carrying surface F to detect the pressure of any material 6 in that region. When any material 6 moves into that region and rides on the upper end of the detecting lever 11, the detecting lever 11 rotates in the counterclockwise direction in FIG. 2 to raise its lower end. An integral hook 13 provided on the lower end of the detecting lever 11 is thus raised into its retracted position where it does not engage with an integral engagement member 14 provided on the pin 2 of the dog 3 as shown in FIG. 2. When no material 6 is present in the detected region, the detecting lever 11 rotates in the clockwise direction in FIG. 2 by its own weight and is brought back into its raised position in which the lower half portion of the detecting lever 11 rests on a stop 15 and the hook 13 can engage with the engagement member 14 as shown on the right-hand side of FIG. 2. Each detecting lever 11 is provided on its lower half portion with a counterweight which urges the upper half portion of the lever 11 into its raised position unless any external force acts on it.

When a particular detecting lever 11 detects a material 6, the engagement member 14 of the corresponding dog 3 is disconnected from the hook 13 of said detecting lever 11. When no material 6 is detected, the engagement member 14 of the corresponding dog 3 engages with the hook 13 of said detecting lever 11 (FIG. 2).

A moving plate 17 is mounted to the frame 10 of the shuttle conveyer 7 and supported on rollers 16 movably in the direction of travel of materials. The moving plate 17 is provided with a plurality of dog pushers 19. The dog pushers 19 contact the engagement members 14 of the corresponding dogs 3 to rotate said dogs 3 in the clockwise direction in FIG. 2 until all the dogs 3 are attracted by the respective magnets 8 and forced into their raised positions simultaneously when the piston rod of an air cylinder 18 advances with the piston rod of the air cylinder 4 in its retracted position.

Figure 1:
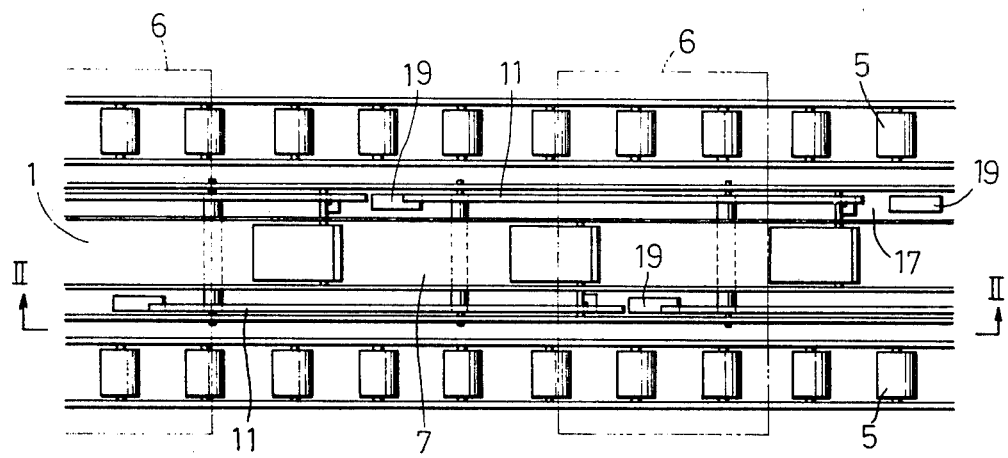
FIG. 1 is a plan view of an embodiment of this invention.

The detecting levers 11, the engagement members 14 and the dog pushers 19 are positioned zigzag on either side of the moving body 1 as shown in FIG. 1 so as not to interfere with one another when the dogs 3 shuttle. The rotation of the pin 2 with respect to each dog 3 is prevented by a key 20 provided on the pin 2 and fitted in a key way 21 provided in the dog 3 as shown in FIG. 5.

Operations of this embodiment will be explained referring to FIGS. 7 through 12.

Figure 7:
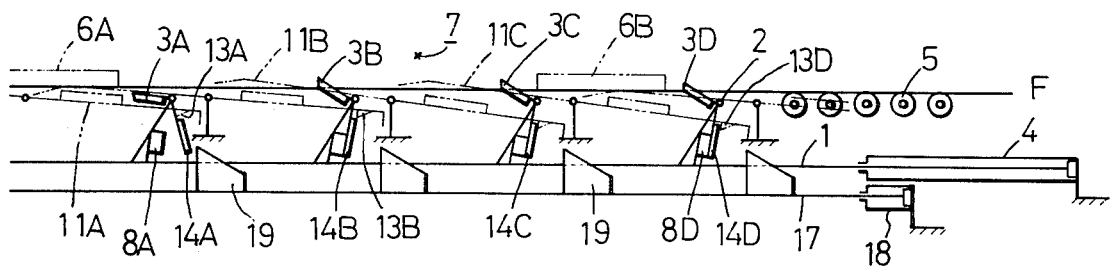
FIGS. 7 through 12 correspond to FIG. 2 and illustrate operations of the embodiment of this invention.
Figure 8:
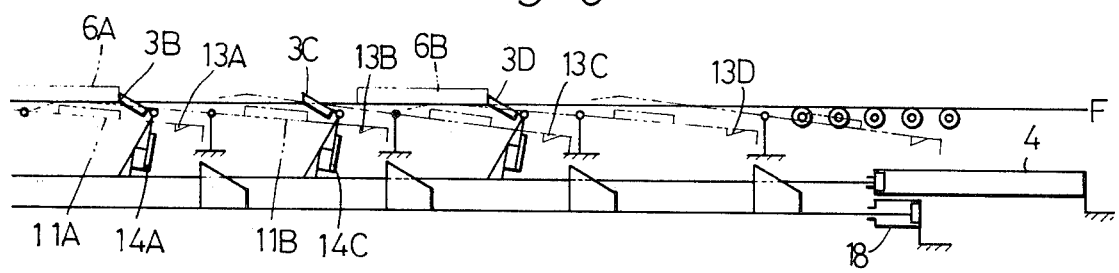

When the detecting lever 11 at the output end of the shuttle conveyer 7 is forced to rotate in the counterclockwise direction in FIG. 2 and the hook 13 of said detecting lever 11 is raised, the materials 6 are accumulated successively toward said output end. In FIG. 7, the numeral 6A indicates the last of the materials conveyed into their accumulated position, while the material 6B is being conveyed on the carrying surface F. The piston rods of the air cylinders 4 and 8 are both in their retracted position. The dog 3A which has just pushed the material 6A forward is in its lowered or concealed position and the other dogs 3B, 3C and 3D shown in FIG. 7 are all in their raised positions. When the piston rod of the air cylinder 4 is advanced as shown in FIG. 8, the material 6B is pushed one step forward by the dog 3D.

Figure 9:
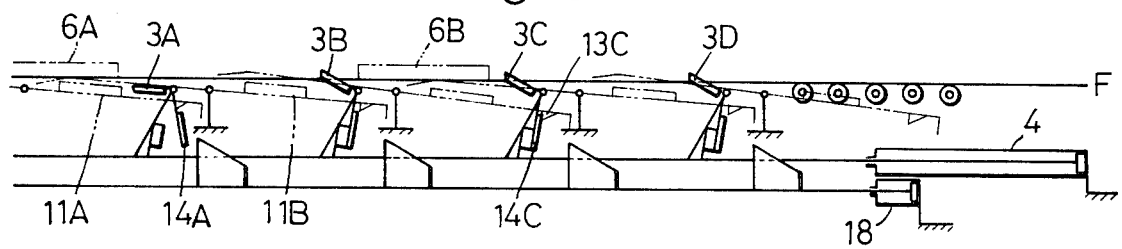

When the piston rod of the air cylinder 4 is withdrawn the dog 3A moves back in its lowered position as the hook 13A on the corresponding detecting rod 11A remains in its raised position. The dog 3C is temporarily forced into its lowered position by contacting the material 6B, but as the hook 13C on the corresponding detecting rod is in its lowered position, the dog 3C retrieves its raised position by engaging with the hook 13C when the piston rod of the air cylinder 4 is returned to its retracted position. The dogs 3B and 3D also maintain their raised positions when they are moved back as shown in FIG. 9.

Figure 10:
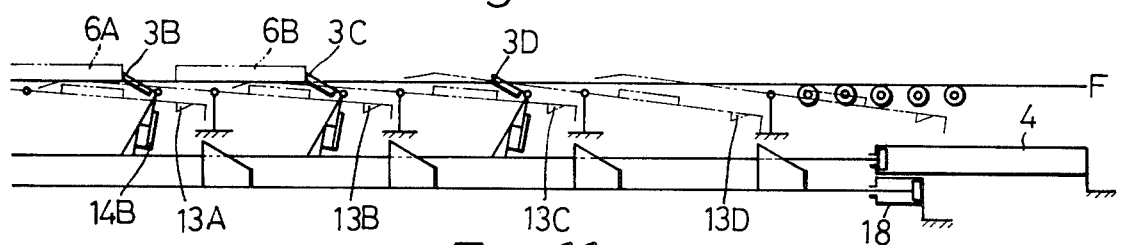

When the piston rod of the air cylinder 4 is again advanced as shown in FIG. 10, the material 6B is pushed by the dog 3C one more step forward.

Figure 11:
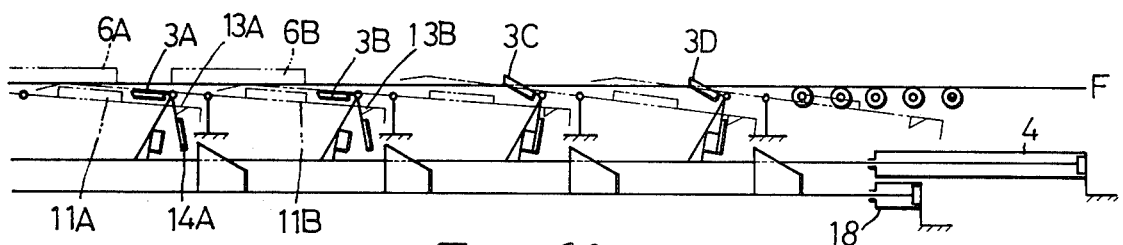

When the piston rod of the air cylinder 4 is then withdrawn, the dog 3B is forced down by the material 6B to withdraw in its lowered position and remains in its lowered position for the detecting lever 11B is maintained by the material 6A in its inoperative position with its hook 13B in its raised position. Accordingly, the dogs 3A and 3B retain their lowered or concealed position when they are moved back as shown in FIG. 11, while the dogs 3C and 3D maintain their raised or operative position. In FIG. 11, it will be noted that even when the piston rod of the air cylinder 4 is advanced or withdrawn, neither the dog 3A or 3B contacts the bottom surface of any materials 6A and 6B accumulated on the conveyer 7. Likewise, additional materials may be accumulated on the shuttle conveyer 7 successively without having their bottom surfaces contacted and damaged by any dogs during the repeated reciprocal motion of the air cylinder 4.

Figure 12:
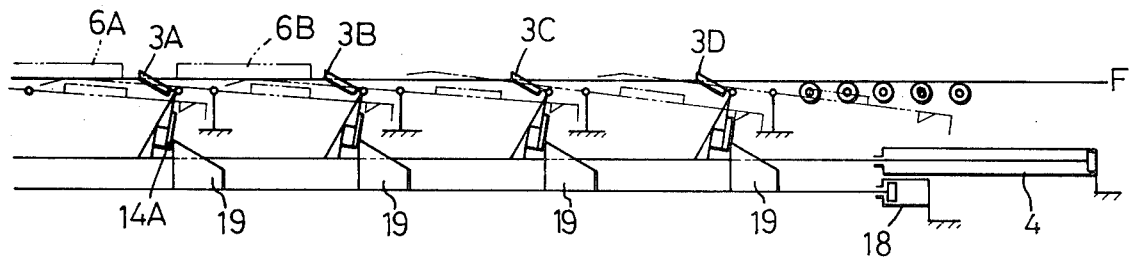

Next, when the detecting lever 11A at the output end of the conveyer 7 is rotated in the clockwise direction to allow the engagement of the hook 13A with the engagement member 14A of the dog 3A, one piece of material 6 on the conveyer 7 is discharged by every two reciprocal movements of the piston rod of the air cylinder 4. In this invention, however, when the piston rod of the air cylinder 18 is advanced in the condition of FIG. 11 irrespective of the position of the detecting lever 11A at the output end of the conveyor 7, all the dog pushers 19 abut on the engagement members 14 of all the dogs 3 to force all the dogs 3 into their raised positions as shown in FIG. 12. When the piston rod of the air cylinder 4 is advanced and withdrawn in the condition of FIG. 12, a piece of material 6 is discharged from the conveyer 7 by each forward movement of the piston rod of the air cylinder 4. It should be understood that other forms of applicant's invention may be had, all coming within the spirit of the invention and the scope of the appended claims.

What is claimed is:

1. An apparatus for accumulating materials on a shuttle conveyer having a plurality of rollers defining a carrying surface on which said materials are conveyed, said apparatus comprising:

a moving body supported on shuttle conveyer frame; cylinder means for reciprocating said moving body along a path of travel of said materials;

a plurality of dogs provided on said moving body and spaced apart from one another along said path of travel at a distance corresponding to the distance of each intermittent travel of said materials, said dogs being each vertically rotatable between a lowered position and a raised position in which each said dog projects above said carrying surface to engage one of said materials upon forward movement of said moving body;

a plurality of means provided on said moving body for magnetically maintaining said dogs in said raised position, but allowing said dogs to rotate into said lowered position upon contact with said materials during backward movement of said moving body; and a plurality of means vertically rotatably supported on said frame for detecting any of said materials in a particular location on said carrying surface, each of said detecting means having one end projecting above said carrying surface ahead of one of said dogs and another end engageable with another of said dogs immediately behind said one dog when no material is detected by said one end to move said other dog into said raised position, said one end being lowered below said carrying surface upon arrival of any said material in said location to prevent said other end from contacting said other dog.

2. An apparatus for accumulating materials on a shuttle conveyer as defined in claim 1 further comprising horizontally reciprocatory means supported on said frame for forcing all said dogs simultaneously into said raised position to advance all of said materials on said conveyer at once when said moving body is in its withdrawn position.

3. An apparatus for accumulating materials on a shuttle conveyer as defined in claim 1, wherein each of said dog maintaining means is a permanent magnet.

4. An apparatus for accumulating materials on a shuttle conveyer as defined in claim 1, wherein each of said dogs is formed by an upper portion adapted to project above said carrying surface and a lower portion engageable with one of said detecting means and one of said dog maintaining means, said upper portion being heavier than said lower portion to maintain each said dog in said lowered position under gravity upon disengagement of said lower portion from said one dog maintaining means.

5. An apparatus for accumulating materials on a shuttle conveyer as defined in claim 1, wherein each of said detecting means is a lever rotatably supported on said frame and having one end projecting above said carrying surface ahead of said one dog, while the other end of said lever is provided with a hook which is engageable with said other dog, said lever being provided with a counterweight located between said other end thereof and said pin to maintain said projection of said one end throughout the absence of any said material in said particular location.

6. An apparatus for accumulating materials on a shuttle conveyer as defined in claim 2, wherein said horizontally reciprocatory means comprises a moving plate extending along said path of travel and provided with a plurality of dog pushers spaced apart from one another along said path of travel at a distance corresponding to said distance dividing said dogs, each of said dog pushers being engageable with one of said dogs to push said one dog in said raised position.

* * * * *